US009908455B2

(12) United States Patent
Phelan, Jr.

(10) Patent No.: US 9,908,455 B2
(45) Date of Patent: Mar. 6, 2018

(54) CARGO PROTECTION DEVICE

(71) Applicant: Diamond 14, LLC, Tallahassee, FL (US)

(72) Inventor: Richard James Phelan, Jr., Orlando, FL (US)

(73) Assignee: Diamond 14, LLC, Tallahassee, FL (US)

(*) Notice: Subject to any disclaimer, the term of this patent is extended or adjusted under 35 U.S.C. 154(b) by 0 days.

(21) Appl. No.: 14/886,755

(22) Filed: Oct. 19, 2015

(65) Prior Publication Data

US 2016/0107562 A1    Apr. 21, 2016

Related U.S. Application Data

(60) Provisional application No. 62/066,671, filed on Oct. 21, 2014.

(51) Int. Cl.
*B60P 7/08*    (2006.01)

(52) U.S. Cl.
CPC .......... *B60P 7/0869* (2013.01); *B60P 7/0853* (2013.01)

(58) Field of Classification Search
CPC .............................. B60P 7/0853; B60P 7/0869
USPC ........ 410/41, 96, 97, 99, 100, 155; 206/453, 206/586; 24/68 CD, 69 CT; 248/345.1
See application file for complete search history.

(56) References Cited

U.S. PATENT DOCUMENTS

| | | | |
|---|---|---|---|
| 6,085,695 A * | 7/2000 | Miller | A01K 27/006 119/795 |
| 6,789,671 B2 | 9/2004 | Morrison et al. | |
| 7,165,294 B2 | 1/2007 | Surdam | |
| 7,311,483 B1 | 12/2007 | Nudo | |
| 7,677,849 B2 | 3/2010 | Scott | |
| 7,901,169 B2 * | 3/2011 | Slocum | B60P 3/079 410/23 |
| 8,079,116 B2 | 12/2011 | Ayers et al. | |
| 9,096,159 B2 * | 8/2015 | Wright | B60P 3/079 410/100 |
| 2014/0069975 A1 * | 3/2014 | Flaherty | B60P 7/0869 267/141 |

* cited by examiner

*Primary Examiner* — Stephen T Gordon
(74) *Attorney, Agent, or Firm* — Stephen C. Thomas; Courtney M. Dunn

(57) ABSTRACT

A cargo protection device and method for use on a ratchet tie-down or other cargo securing device. The cargo protection device comprises a tubular sleeve through which a ratchet tie-down can thread through. The sleeve comprises an opening in its side wall through which the ratchet handle can exit the sleeve and be accessed and actuated by a user. In use, the sleeve protects the cargo from abrasion while the cargo is being secured or transported.

13 Claims, 5 Drawing Sheets

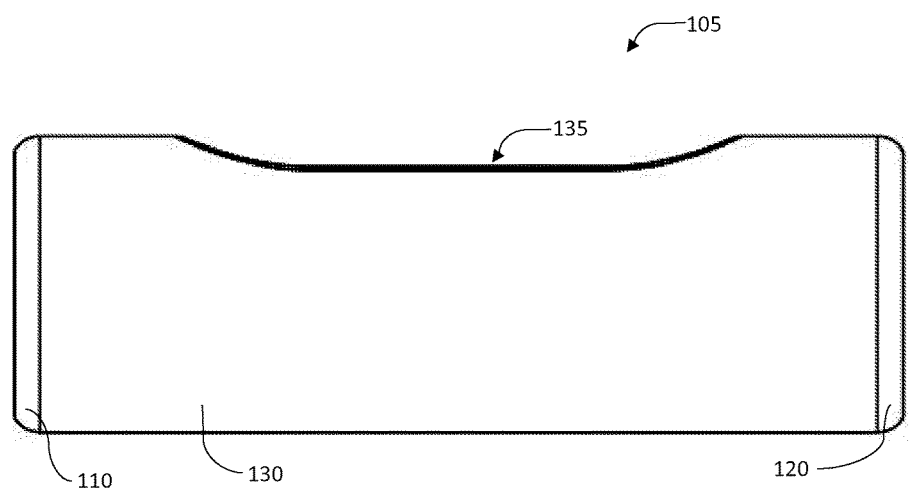
FIG. 4
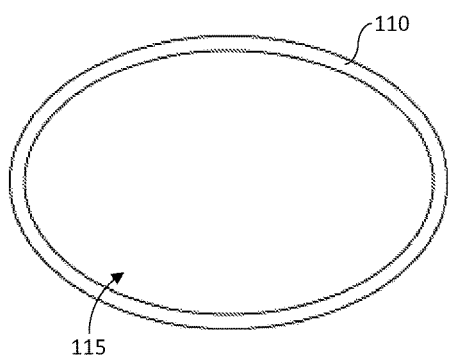 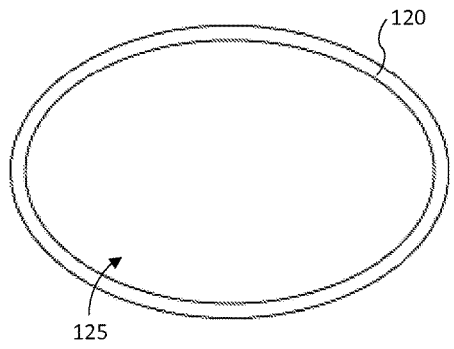
FIG. 5  FIG. 6

CARGO PROTECTION DEVICE

CROSS-REFERENCE TO RELATED APPLICATIONS

This application claims priority to U.S. Provisional Patent Application No. 62/066,671, filed Oct. 21, 2014, entitled "Cargo Tie Down Protection System", which is hereby incorporated by reference herein in its entirety.

FIELD OF INVENTION

The present disclosure generally relates to the transport of cargo; more specifically, to a cargo protection device.

BACKGROUND

Cargo is often transported in vehicles such as railway cars, trailers or trucks flatbeds or decks or, in some cases, on a car rooftop. To prevent movement or loss of the cargo, tie-down devices are typically used to secure the cargo. Conventional tie-down devices for securing cargo on vehicles, include, for example, ratchet straps or ropes. In use, such tie-down devices are tensioned to secure the cargo. Such tension against the cargo can cause damage to the cargo or portions of the cargo. What is needed in the art is a device that can protect the cargo from abrasions caused by the tie-down devices.

SUMMARY

In accordance with the teachings disclosed herein, embodiments related to a cargo protection device are disclosed.

In an embodiment, the invention comprises a cargo protection device for use with a ratchet tie-down or other cargo securing device. The cargo tie-down protection device comprises a hollow sleeve having two open or partially open ends through which a ratchet tie-down may pass. The sleeve further comprises an opening in a side wall through which a ratchet handle can exit the sleeve and be accessed by a user without the need to relocate the protection device. The hollow sleeve is comprised of a flexible material. In use, the sleeve of the invention protects cargo from abrasion caused by tie-downs, ropes, straps or the like while the cargo is being secured or transported. The cross section of the sleeve may be any shape such as circular (forming a cylindrical sleeve), elliptical (forming an elliptically cylindrical sleeve), square (forming a square tubular sleeve), rectangular (forming a rectangular tubular sleeve) or any other cross sectional shape.

In another embodiment, the invention comprises a method for protecting cargo secured by a ratchet tie-down. The method comprises providing a cargo protection device as described above and a ratchet tie-down having two ends and a ratchet that has a handle. The handle may be used for tightening the ratchet tie-down when each of the ends of the ratchet tie-down are attached to a structure. The method further comprises passing one end of the ratchet tie-down through a hollow sleeve and securing that end to a structure. A portion of the ratchet tie-down is placed over a cargo to be secured. Then, the ratchet is positioned within the hollow sleeve of the cargo protection device such that no portion of the ratchet touches the cargo and a portion of the ratchet handle protrudes through the third opening of the cargo protection device and can be operated to tighten the ratchet tie-down. Once the ratchet is positioned within the sleeve, the other end of the ratchet tie-down is secured to the structure. The ratchet tie-down is then tightened against the cargo by operating the ratchet handle.

BRIEF DESCRIPTION OF THE DRAWINGS

FIG. 4 is a side elevational view of a cargo protection device according to an embodiment of the present invention.

FIG. 5 is a front view of a cargo protection device according to an embodiment of the present invention.

FIG. 6 is a back view of a cargo protection device according to an embodiment of the present invention.

DETAILED DESCRIPTION OF THE PREFERRED EMBODIMENTS

Figure 1:
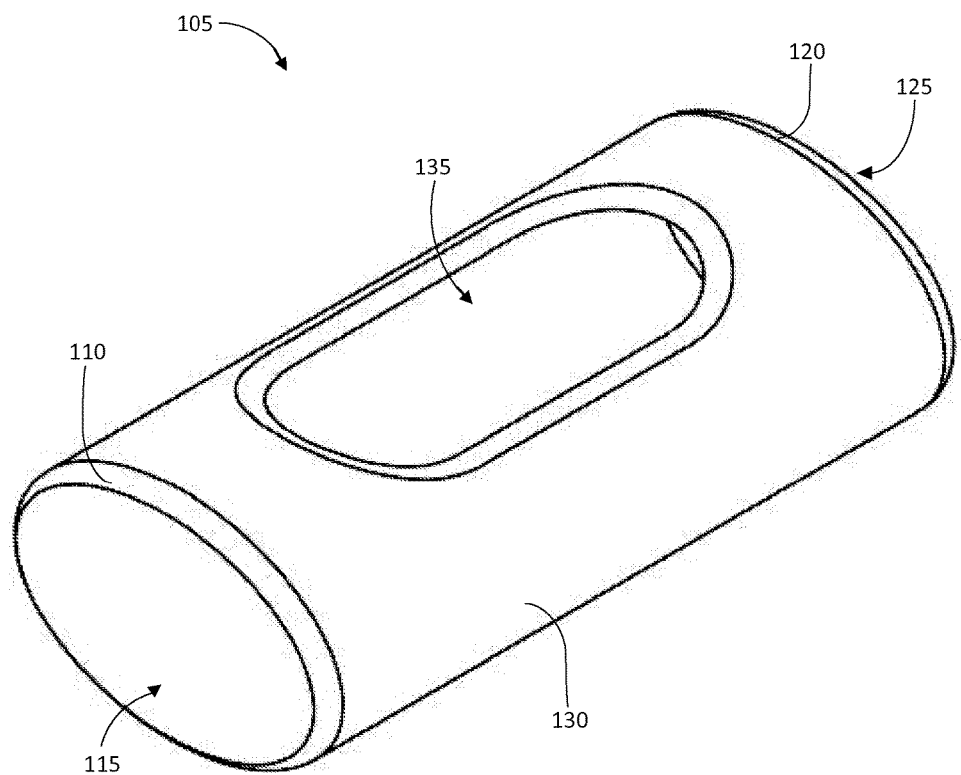
FIG. 1 is a (top/front) perspective view of a cargo protection device according to an embodiment of the present invention.
Figure 2:
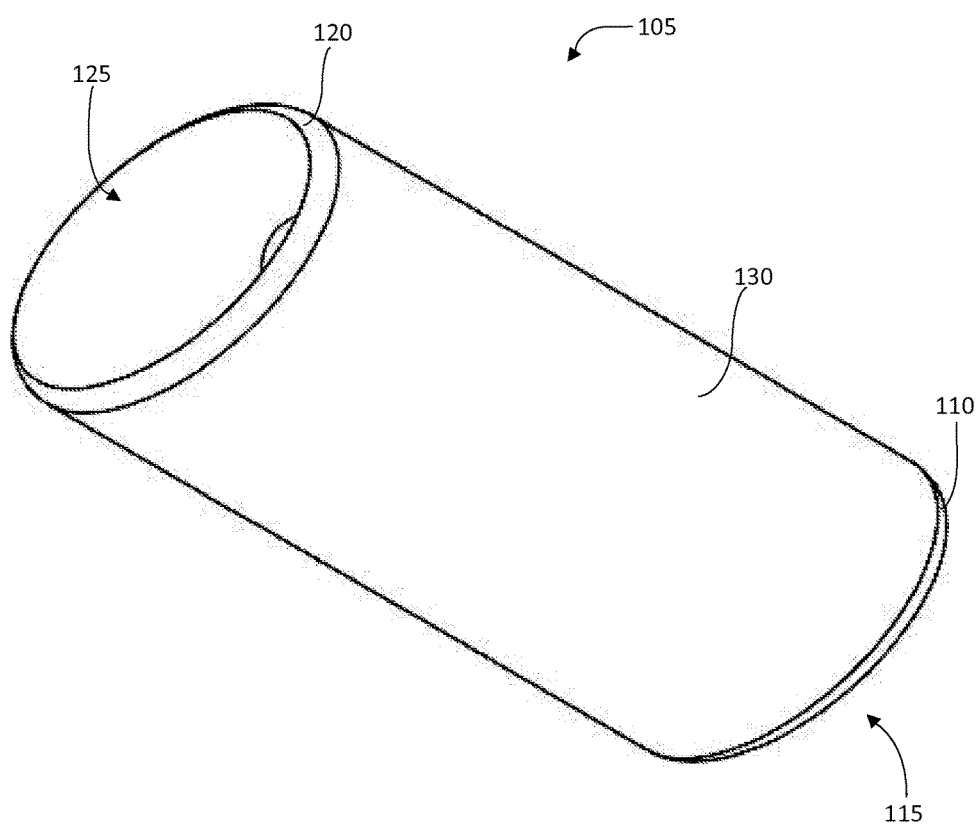
FIG. 2 is a (bottom/back) perspective view of a cargo protection device according to an embodiment of the present invention.
Figure 3:
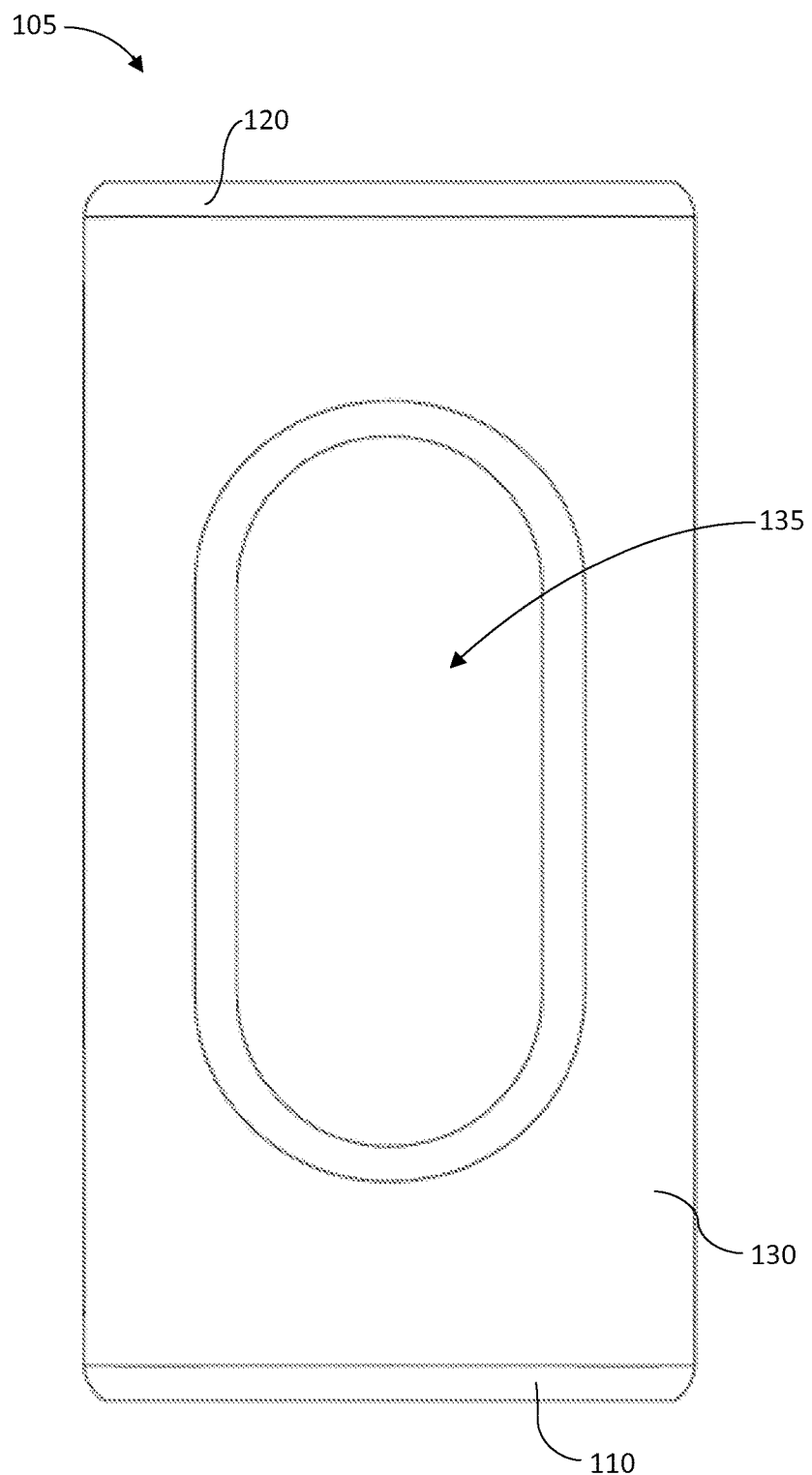
FIG. 3 is a top plan view of a cargo protection device according to an embodiment of the present invention.

A detailed description of the embodiments for a device for cargo tie-down protection will now be presented with reference to FIGS. 1 through 7. One of skill in the art will recognize that these embodiments are not intended to be limitations on the scope, and that modifications are possible without departing from the spirit thereof. In certain instances, well-known methods, procedures, components, and circuits have not been described in detail.

Referring to FIG. 1 through 6, an embodiment of the cargo protection device comprises hollow sleeve 105. Sleeve 105 may be a circular or elliptical cylinder or may take on other hollow shapes such as, for example, a square tube or rectangular tube. Sleeve 105 comprises a first end 110 and a second end 120. First end 110 comprises opening 115 and second end 120 comprises opening 125. Although shown in FIG. 1 to comprise the entirety of first end 110 and second end 120, first opening 115 and second opening 125 may comprise only a portion of first end 110 and second end 120. Sleeve 105 also comprises opening 135 in side wall 130 of sleeve 105.

Embodiments of the cargo protection device may be used to protect the surface of cargo or a piece of cargo from abrasion while it is being tied down or secured or while it is being transported. Embodiments of the cargo protection device may partially encapsulate a rope or strap (e.g. along a portion of its longitudinal length) and/or at least partially encapsulate a ratchet or other tie-down mechanism (e.g. along a portion of its longitudinal length).

Sleeve 105 may be made of any durable, flexible material, such as, for example, neoprene, rubber, polymers of isoprene, polyisoprene, elastomers, synthetic rubbers, or plastic such as, for example, polyethylene, polyvinyl chloride, polypropylene, polyurethane or any other flexible plastic material. Sleeve 105 may also be made of a lightweight material or of fabric. In the case in which sleeve 105 is fabricated from material that may be stitched such as fabric or neoprene, binding, in which one or more layers of additional material are overlaid and then attached to sleeve 105 by means such as stitching or chemical bonding, may be used on the edges of sleeve 105 that create openings 115, 125 and 135 to reinforce either or both of these edges. Other means of reinforcement as may be known in the art may be used to reinforce the edges of sleeve 105 that create openings 115, 125 and 135.

Figure 7:
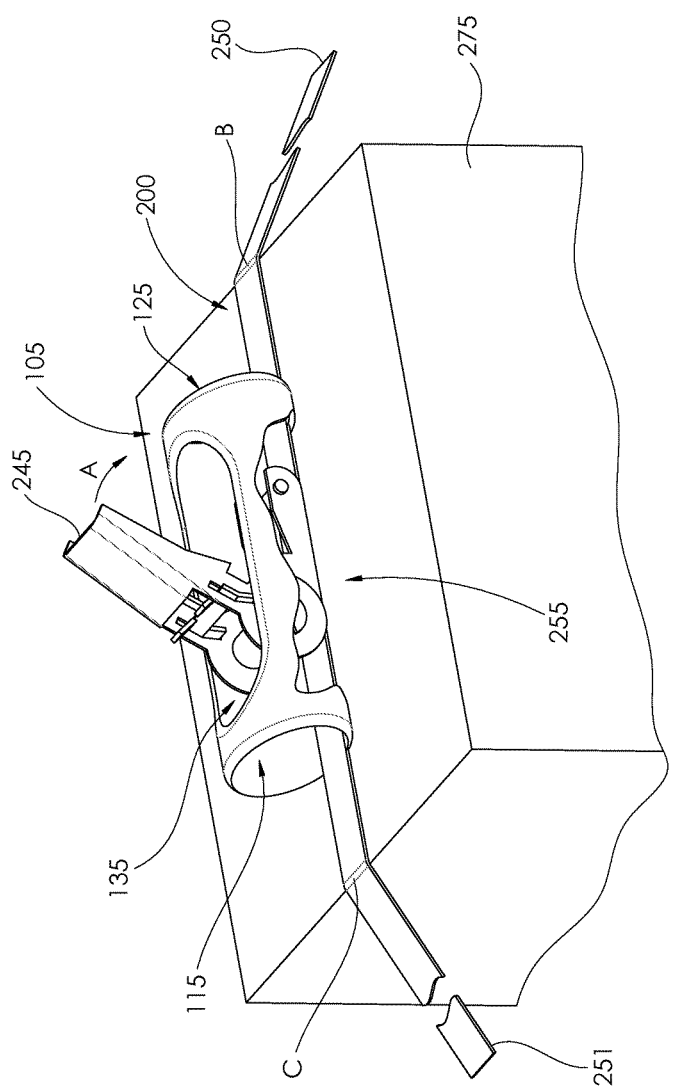
FIG. 7 is a perspective view of a cargo protection device in use with a ratchet tie-down according to an embodiment of the present invention.

An embodiment of a cargo protection device in use over a ratchet tie-down is shown in FIG. 7. One end of straps or rope of ratchet tie-down 200 can be threaded through openings 115 and 125. Openings 115 and 125 are sized to receive ratchet 255 to allow ratchet 255 to pass into sleeve 105. In other embodiments, sleeve 105 and openings 115 and 125 may be sized to receive a rope or other cable or the largest part of a tie-down device or the portion of the tie-down device that cargo 275 is to be protected from, which may be, for example, a rope or a knot of a rope. Opening 135 is sized to receive ratchet handle 245 to allow ratchet handle 245 to pass through opening 135 and out of sleeve 105. In alternative embodiments, opening 135 may be sized to receive a knot of a rope or other securing device. Sleeve 105 is of sufficient length to protect cargo 275 from abrasion which may be, for example, the length of ratchet 255. Opening 135 is sized to allow operation of ratchet handle 245 passing there through, depicted exemplarily by motion A. In this manner the ratchet tie-down 200 may be tightened against cargo 275.

Still referring to FIG. 7, the invention further comprises a method for protecting cargo 275 secured by ratchet tie-down 200 which may be comprised of the steps of providing a cargo protection device which is hollow sleeve 105 comprised of a flexible material and having a first end and a second end, wherein the first end comprises first opening 115 and the second end comprises second opening 125 and wherein first opening 115 and second opening 125 are each sized to allow the largest portion of ratchet tie-down 200, which is generally ratchet 245, to pass there through. Sleeve 105 may also have third opening 135 in a side of sleeve 105 sized to allow operation of ratchet handle 245 passing there through. Ratchet tie-down 200, having first end 250 and second end 251 and ratchet 255 having handle 245 for tightening ratchet tie-down 200 when each of first end 250 and second end 251 are attached to a structure, is then provided, and a user may pass first end 250 of ratchet tie-down 200 through hollow sleeve 105 and secure it to the structure. The user then may place a portion of the ratchet tie-down 200 over cargo 275 and may position ratchet 255 within hollow sleeve 105 such that a portion of ratchet handle 245 protrudes through third opening 135 and is able to be operated for tightening ratchet tie-down 200 as depicted by arrow A. The user may position ratchet 255 within the sleeve 105 so that no portion of ratchet 255 touches cargo 275 and then may secure second end 251 of ratchet tie-down 200 to the structure. Finally, the user may tighten ratchet tie-down 200 against cargo 275 by operating ratchet handle 245 as depicted by arrow A, which is at least partially protruding through third opening 135.

In an alternate embodiment, hollow sleeve 105 may extend beyond the edges of cargo 275 and thus may extend beyond points B and C, thus protecting the edges of cargo 275 from damage when ratchet tie-down 200 is tightened in order to secure cargo 275.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A cargo protection device for use with a ratchet tie-down comprising:
   a hollow sleeve comprised of a flexible material and having a first end, a second end, and an interior perimeter that extends between the first end and the second end, wherein the first end comprises a first opening, and the second end comprises a second opening and wherein the first opening, the second opening, and the interior perimeter are each uniformly sized to allow a ratchet tie-down handle to pass there through and the interior perimeter extends uniformly in size from the first opening to the second opening; and
   a third opening in a side wall of the hollow sleeve, wherein the third opening is sized to allow operation of a ratchet tie-down handle passing there through.

2. The cargo protection device of claim 1, wherein the sleeve forms a circular cylinder.

3. The cargo protection device of claim 1, wherein the sleeve forms an elliptical cylinder.

4. The cargo protection device of claim 1, wherein the sleeve forms a square tube.

5. The cargo protection device of claim 1, wherein the sleeve forms a rectangular tube.

6. The cargo protection device of claim 1, wherein the edges forming the first opening, the second opening and the third opening are reinforced edges.

7. The cargo protection device of claim 1, wherein the flexible material is further defined as neoprene.

8. A method for protecting cargo secured by a ratchet tie-down, comprising:
   providing a cargo protection device comprising a hollow sleeve comprised of a flexible material and having a first end and a second end, wherein the first end comprises a first opening and the second end comprises a second opening and wherein the first opening and the second opening are each sized to allow the ratchet tie-down to pass there through, and a third opening in a side wall of the hollow sleeve, wherein the third opening is sized to allow operation of a ratchet tie-down handle passing there through;
   providing the ratchet tie-down having a first end, a second end and a ratchet having the handle for tightening the ratchet tie-down when each of the first end and second end of the ratchet tie-down are attached to a structure;
   passing the first end of the ratchet tie-down through the hollow sleeve and securing the first end of the ratchet tie-down to the structure;
   placing a portion of the ratchet tie-down over a cargo to be secured;
   positioning the ratchet within the hollow sleeve such that no portion of the ratchet touches the cargo and a portion of the ratchet handle protrudes through the third opening and is able to be operated for tightening the ratchet tie-down;
   securing the second end of the ratchet tie-down to the structure; and
   tightening the ratchet tie-down against the cargo by operating the ratchet handle.

9. The method of claim 8, wherein the sleeve of the cargo protection device forms a circular cylinder.

10. The method of claim 8, wherein the sleeve of the cargo protection device forms an elliptical cylinder.

11. The method of claim 8, wherein the sleeve of the cargo protection device forms a square tube.

12. The method of claim 8, wherein the sleeve of the cargo protection device forms a rectangular tube.

13. The method of claim 8, wherein the flexible material comprising the cargo protection device is further defined as neoprene.

\* \* \* \* \*